US008994926B2

(12) United States Patent
Dyer

(10) Patent No.: US 8,994,926 B2
(45) Date of Patent: Mar. 31, 2015

(54) OPTICAL PROXIMITY SENSORS USING ECHO CANCELLATION TECHNIQUES TO DETECT ONE OR MORE OBJECTS

(75) Inventor: Kenneth C. Dyer, Pleasanton, CA (US)

(73) Assignee: Intersil Americas LLC, Milpitas, CA (US)

( * ) Notice: Subject to any disclaimer, the term of this patent is extended or adjusted under 35 U.S.C. 154(b) by 350 days.

(21) Appl. No.: 13/491,476

(22) Filed: Jun. 7, 2012

(65) Prior Publication Data

US 2013/0208257 A1 Aug. 15, 2013

Related U.S. Application Data

(60) Provisional application No. 61/598,690, filed on Feb. 14, 2012.

(51) Int. Cl.
*G01C 3/08* (2006.01)

(52) U.S. Cl.
USPC .......... 356/4.01; 356/3.01; 356/4.1; 356/5.01

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| 4,921,351 A | 5/1990 | Kohigashi et al. |
| 5,045,685 A | 9/1991 | Wall |
| 5,389,927 A | 2/1995 | Turney et al. |
| 7,023,963 B1 | 4/2006 | Chu et al. |
| 7,486,386 B1 | 2/2009 | Holcombe et al. |
| 7,728,316 B2 | 6/2010 | Fadell et al. |
| 7,907,061 B2 | 3/2011 | Lin et al. |
| 8,222,591 B2 | 7/2012 | Lin |
| 2004/0019443 A1* | 1/2004 | Jones et al. ..................... 702/79 |
| 2004/0044489 A1 | 3/2004 | Jones et al. |
| 2007/0099574 A1 | 5/2007 | Wang |
| 2008/0135735 A1 | 6/2008 | Gottesman et al. |
| 2008/0158184 A1 | 7/2008 | Land et al. |
| 2010/0048137 A1 | 2/2010 | Liu |
| 2010/0245289 A1 | 9/2010 | Svajda |
| 2010/0254711 A1 | 10/2010 | Miller |
| 2010/0277713 A1* | 11/2010 | Mimeault ..................... 356/5.01 |

(Continued)

OTHER PUBLICATIONS

"Digital Voice Echo Canceller with a TMS32020," Application Report SPRA129, http://www.ti.com/lit/an/spra129/spra129.pdf, Texas Instruments (1989), 43 pages.

(Continued)

*Primary Examiner* — Luke Ratcliffe
(74) *Attorney, Agent, or Firm* — Vierra Magen Marcus LLP

(57) ABSTRACT

An optical sensor includes a driver, light detector and echo canceller. The driver is adapted to selectively drive a light source. The light detector is adapted to produce a detection signal indicative of an intensity of light detected by the light detector. The echo canceller is adapted to produce an echo cancellation signal that is combined with the detection signal produced by the light detector to produce an echo cancelled detection signal having a predetermined target magnitude (e.g., zero). The echo canceller includes a coefficient generator that is adapted to produce echo cancellation coefficients indicative of distance(s) to one or more objects, if any, within the sense region of the optical sensor. The optical sensor can also include a proximity detector adapted to detect distance(s) to one or more objects within the sense region of the optical sensor based on the echo cancellation coefficients generated by the coefficient generator.

26 Claims, 8 Drawing Sheets

(56) References Cited

U.S. PATENT DOCUMENTS

| | | |
|---|---|---|
| 2011/0044397 A1 | 2/2011 | Gregorian et al. |
| 2011/0121182 A1 | 5/2011 | Wong et al. |
| 2013/0120761 A1 | 5/2013 | Dyer |

OTHER PUBLICATIONS

"Canceling Echoes in Long-Distance Telephone Circuits," Chapter 12: Adaptive Interference Canceling, pp. 339-347 (1985), Prentice-Hall.

Chapter 20: "Echo Cancellation," http://users.ece.gatech.edu/~barry/digital/supp/20echo.pdf, date unknown, accessed Dec. 13, 2011.

"Echo Basics Tutorial," Ditech Networks 2011, 10 pages.

VCNL4000 Datasheet, "Fully Integrated Proximity and Ambient Light Sensor with Infrared Emitter and I2C Interface," Vishay Semiconductors, Rev. 1.6, Aug. 24, 2011, pp. 1-14.

Hoppenstein, R. "DC Offset Auto-Callibration of TRF371x," Application Report SLWA057, Texas Instruments Incorporated, Mar. 2010, pp. 1-8.

Office Action dated Jun. 20, 2014, in U.S. Appl. No. 13/360,168 filed Jan. 27, 2012.

Amendment dated Jul. 10, 2014, in U.S. Appl. No. 13/360,168 filed Jan. 27, 2012.

Notice of Allowance dated Jul. 29, 2014, in U.S. Appl. No. 13/360,168 filed Jan. 27, 2012.

\* cited by examiner

OPTICAL PROXIMITY SENSORS USING ECHO CANCELLATION TECHNIQUES TO DETECT ONE OR MORE OBJECTS

PRIORITY CLAIM

This application claims priority under 35 U.S.C. 119(e) to U.S. Provisional Patent Application No. 61/598,690, entitled OPTICAL PROXIMITY SENSORS USING ECHO CANCELLATION TECHNIQUES TO DETECT OBJECTS, filed Feb. 14, 2012, which is incorporated herein by reference.

RELATED APPLICATION

This application is related to commonly assigned U.S. patent application Ser. No. 13/360,168, entitled OPTICAL PROXIMITY SENSORS WITH OFFSET COMPENSATION, filed Jan. 27, 2012, which is incorporated herein by reference.

BACKGROUND

Optical sensors, such as optical proximity sensors, typically include a light source and an adjacent photosensitive light detector. Such optical sensors can be used to detect the presence of an object, estimate proximity of an object and/or detect motion of an object, based on the magnitude of light originating from the light source that is reflected from an object and detected by the light detector. The value of these sensors has become more important with the advent of battery-operated handheld devices, such as mobile phones. For example, a fair amount of the energy from a mobile phone battery is used to drive the display, and there is value in turning off the display or backlight when the mobile phone or other device is brought to the user's ear (where it cannot be viewed anyway). Optical proximity sensors have been used for this, and many other applications.

For other examples, there are many other applications in which the presence of an object can be detected with an optical proximity sensor to advantage. These range from sensing when protective covers have been opened on machinery, paper has been positioned correctly in a printer, or an operator's hands are at risk near an operating machine. An optical proximity sensor can also be used as a simple touch or near-touch activated switch, and could be implemented in applications like keyboards or devices that have a plastic housing that is sealed but which allows the light from the source to pass through and be sensed by the detector on the return.

Light from the source to the detector that is not transmitted toward the target object, but rather is transmitted directly from the source to the detector, reduces the capability of the overall device to sense distance. Such light essentially propagates sideways within the package and is considered noise or "light leakage", and contains no information. To reduce and preferably prevent light leakage, an opaque light barrier is typically used to isolate the light source from the light detector. However, light barriers increase the complexity, cost and size of optical sensors. Additionally, light barriers are often imperfect, resulting in light leaking under, over and/or through the barrier.

Optical sensors are often used with (e.g., placed behind and/or covered by) a cover plate that is glass, plastic, or some other protective light transmissive material. For example, the cover plate can be the glass covering a screen of a mobile phone, portable music player or personal data assistant (PDA), or the plastic or glass covering a screen of a laptop, netbook or tablet computer. When such a cover plate is placed over an optical sensor, the optical sensor is often susceptible to specular reflections. Specular reflections similarly reduce the capability of the overall device to sense proximity, since specular reflections are essentially noise that contain no information.

In view of the above, there has been a desire to compensate for light being transmitted directly from a light source to a light detector, as well as specular reflections and/or other internally reflected light. Conventional attempts to achieve these goals typically relate to modification of the mechanical/structural design of optical sensors.

Additionally, conventional optical proximity sensors are not able to simultaneously detect multiple objects located at multiple distances from the optical sensor. It would be useful if an optical proximity sensor included such a capability.

DETAILED DESCRIPTION

Figure 1A:
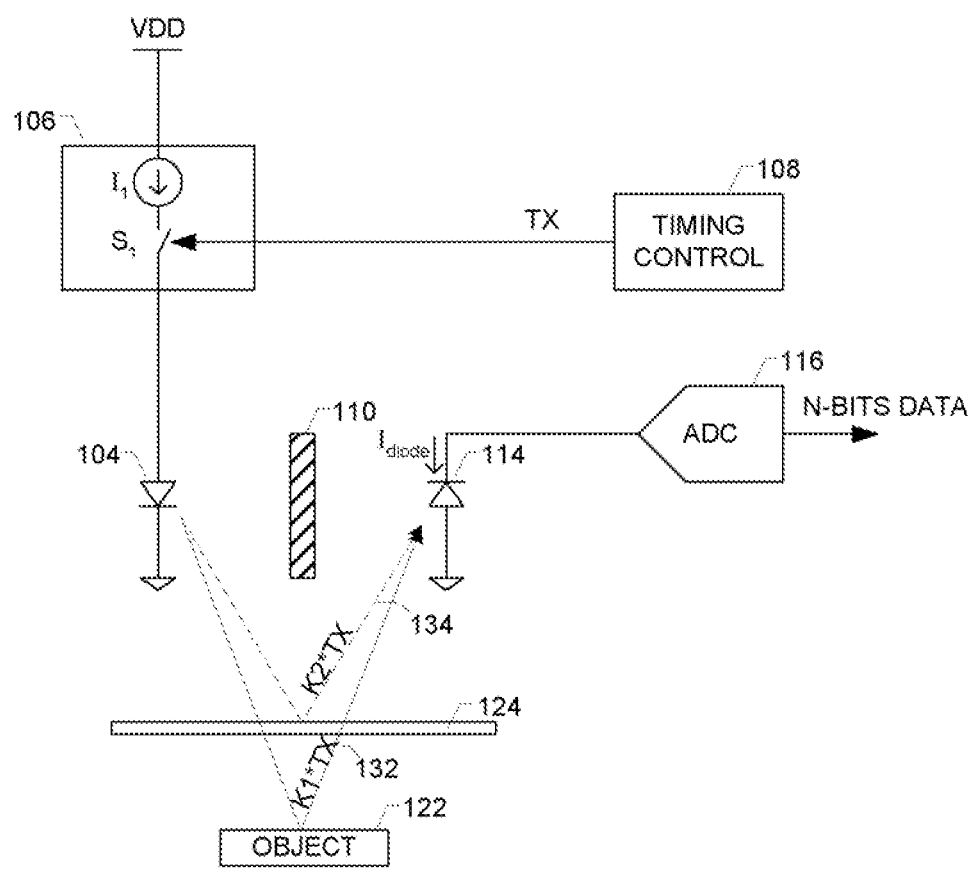
FIGS. 1A and 1B show an exemplary optical proximity sensor.

In the following detailed description, reference is made to the accompanying drawings that form a part hereof, and in which is shown by way of illustration specific illustrative embodiments. It is to be understood that other embodiments may be utilized and that mechanical and electrical changes may be made. The following detailed description is, therefore, not to be taken in a limiting sense. In the description that follows, like numerals or reference designators will be used to refer to like parts or elements throughout. In addition, the first digit of a reference number identifies the drawing in which the reference number first appears.

FIG. 1A shows an exemplary optical proximity sensor 102, which can be a proximity sensor useful to detect the presence of an object, estimate proximity of an object and/or detect motion of an object. The optical sensor 102 includes a light detector 114 (also known as a photodetector), a driver 106, a timing controller 108, and an analog-to-digital converter (ADC) 116. The driver 106 is controlled by a transmit (TX) signal output by the timing controller 108 to selectively drive a light source 104. The light detector 114 generates an analog signal (e.g., a current) that is indicative of the intensity of the light incident on the light detector 114. The ADC converts the analog signal (e.g., a current) generated by the light detector 114 into a digital signal (e.g., an N-bit signal) that can be used to detect the presence, proximity and/or motion of an object 122. The light source 104 can be, e.g., one or more light emitting diode (LED) or laser diode, but is not limited thereto. While infrared (IR) light sources are often employed in optical sensors, because the human eye can not detect IR light, the light source can alternatively produce light of other wavelengths. The light detector can be, e.g., one or more photodiode (PD), but is not limited thereto.

The driver 106 is generally shown as including a current source $I_1$ and a switch $S_1$ that is selectively closed based on the transmit (TX) signal output by the timing controller 108. When the switch $S_1$ is closed, the current produced by the current source $I_1$ is provided to the anode of the light source 104, to thereby selectively cause light to be transmitted. Alternatively, the TX signal can selectively cause a current to be pulled through the light source 104, e.g., by coupling the switch $S_1$ and the current source $I_1$ between the cathode of the light source 104 and a low voltage rail (e.g., ground), to thereby cause light to be transmitted. In such an alternative configuration, the current source may be referred to as a current sink.

An object within the sense region of the optical sensor and whose proximity, presence and/or motion is being detected by the sensor 102 is represented by block 122. The sense region refers to the region or area within which an object can be detected by the optical sensor. An object can be outside of the sense region, e.g., if the object is too far away from the optical sensor; or if the object, even if close to the optical sensor, is positioned relative to the sensor such that light emitted by the light source is not reflected back to the light detector.

An opaque light barrier 110 is shown as being located between the light source 104 and the light detector 114, to isolate the light source from the light detector. However, as mentioned above, light barriers are often imperfect, resulting in light leaking under, over and/or through the barrier. A cover plate 124, which protects and/or disguises the light source 104 and the light detector 114, can be part of the optical sensor 102 or can be external (e.g., adjacent) the optical sensor 102. Such a cover plate 124, as mentioned above, may cause specular reflections and/or other internal reflections. Internal reflections can also result from other physical parts included within the optical sensor 102. For the purpose of the description herein, the cover plate 124 is not considered an object within the sense region of the optical sensor, since it is preferable that the optical sensor operates as if the cover plate 124 was not present. The cover plate 124 can be a piece of glass, plastic, or other light transmissive material that, e.g., covers a screen of a mobile phone, portable music player, PDA, laptop, netbook or tablet computer, but is not limited thereto.

Still referring to FIG. 1A, light transmitted by the light source 104, reflected by the object 122, and incident on the photodetector 114, is represented by line 132. Such reflected light of interest causes the photodetector 114 to produce a signal (e.g., a current) that can be expressed as K1*TX, where K1 is indicative of a magnitude of the light reflected from the object 122 and incident on the light detector 114, and TX is a binary value of either 0 or 1.

In FIG. 1A, light that is generally not of interest (at least with regard to detecting the proximity, presence and/or motion of the object 122) is represented by dashed line 134 and can be caused by specular reflections and/or other internal reflections and/or light leaking under, over and/or through the barrier 110. Such light that is generally not of interest (at least with regard to detecting the proximity, presence and/or motion of the object 122), shall be generally referred to as interference light, and causes the photodetector 114 to produce a signal (e.g., a current) that can be expressed as K2*TX, where K2 is indicative of a magnitude of the interference light incident on the light detector 114, and TX is the binary value of either 0 or 1. Such interference light reduces the dynamic range of the optical sensor 102, which reduces the detection range of the optical sensor 102. Interference light, as the term is used herein, does not include ambient light, which may be from sun light, halogen light, incandescent light, fluorescent light, etc.

As can be appreciated from the above discussion, the light detector 114 (e.g., a photodiode) produces a detection signal (e.g., $I_{diode}$) that can be expressed as $I_{diode}$=K1*TX+K2*TX (ignoring ambient light, for the time being). As explained above, with regard to detecting the proximity, presence and/or motion of the object 122, K1*TX is indicative of the light of interest, and K2*TX is indicative of the interference light. In other words, the detection signal (e.g., $I_{diode}$) produced by the light detector includes both light of interest as well as interference light. The detection signal (e.g., $I_{diode}$) may also include ambient light, which may also not be of interest (at least with regard to detecting the proximity, presence and/or motion of the object 122). There are various different techniques to reduce and preferably minimize the affects of ambient light, some of which are described herein. However, initially, most of the discussion below will not focus on ambient light.

Figure 1B:
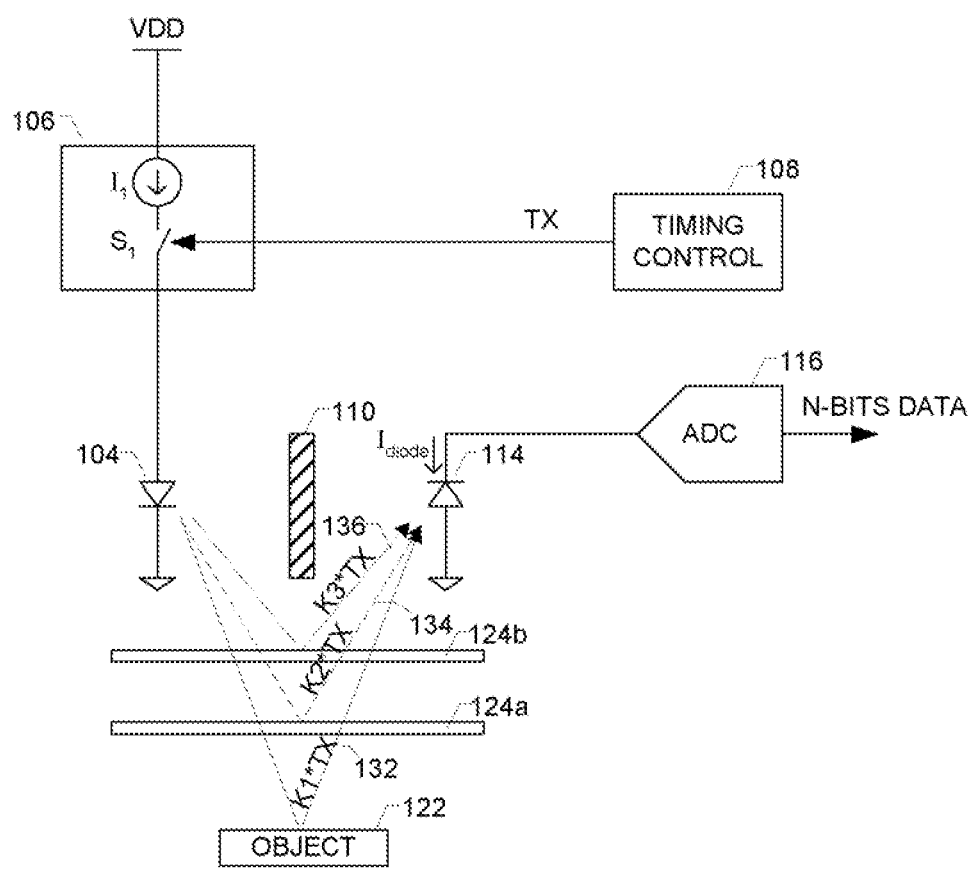
Figure 2:
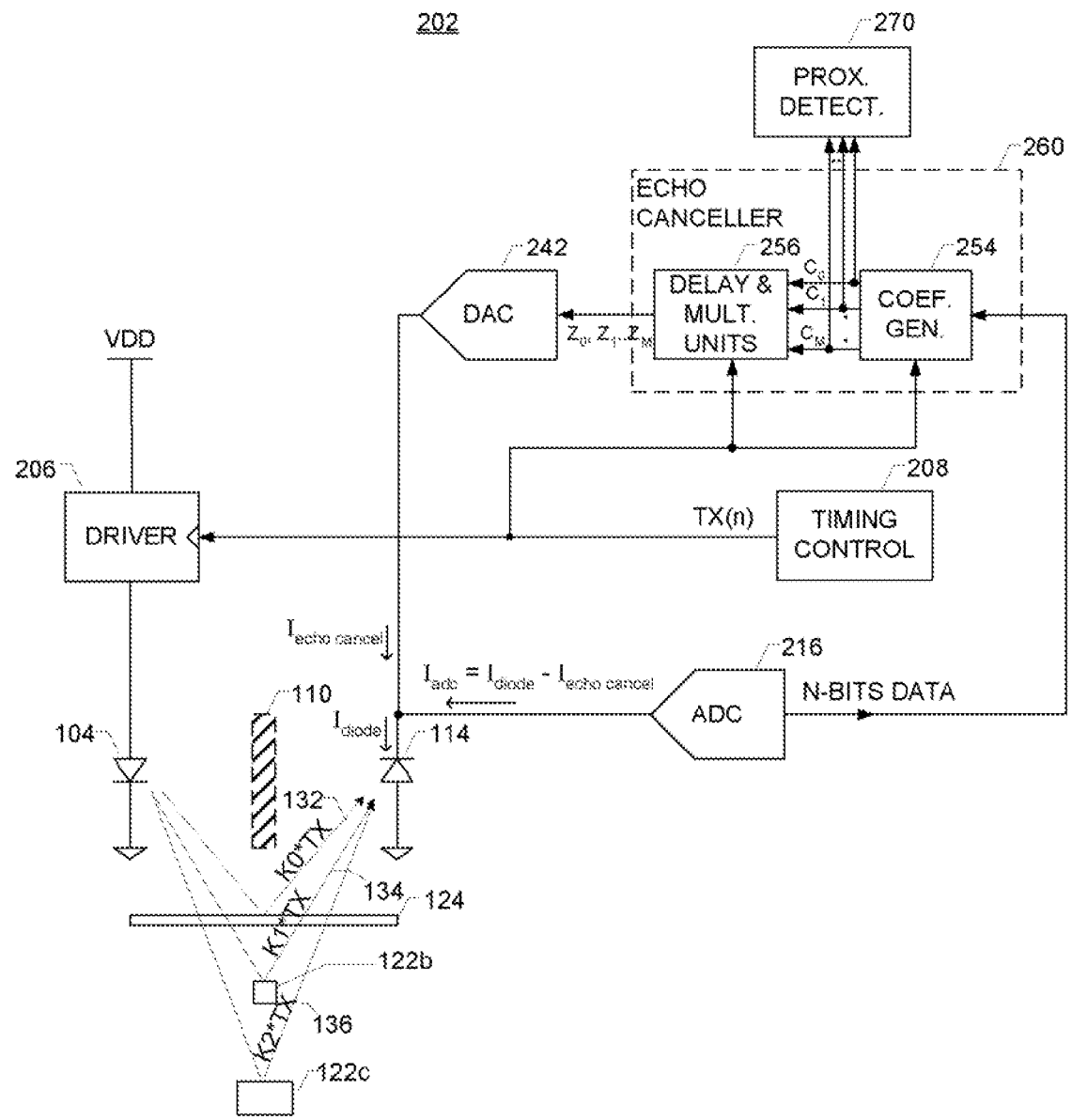
FIG. 2 illustrates an optical sensor 202, according to an embodiment of the present invention, that uses echo cancellation techniques to detect the proximity of one or more objects within the sense region of the optical sensor.

FIG. 1B is used to illustrate that additional interference may occur where two cover plates 124a and 124 cover the light source and light detector. This may happen, e.g., where one cover plate (e.g., 124a) is the glass surface of a smart phone within which the optical sensor is installed, and the other cover plate (e.g., 124b) is part of the optical sensor package. In this example, the light detector 114 (e.g., a photodiode) produces a detection signal (e.g., $I_{diode}$) that can be expressed as $I_{diode}$=K1*TX+K2*TX+K3*TX (ignoring ambient light, for the time being). In FIG. 1B, the additional dashed line 136 is representative of the specular reflections caused by the cover plate 124b. FIG. 2, discussed below, illustrates how $I_{diode}$ can be expressed using a similar formula where there is one cover plate 124 and two objects 122b and 122c beyond the cover plate 124.

FIG. 2 illustrates an optical sensor 202, according to an embodiment of the present invention, that uses echo cancellation techniques to detect the proximity of one or more objects within the sense region of the optical sensor 202. The optical sensor 202 includes a light detector 114 (also known as a photodetector), a driver 206, a timing controller 208, and an analog-to-digital converter (ADC) 216. The optical sensor 202 also includes an echo canceller 260, which is shown as including a coefficient generator 254 and delay and multiplication units 256.

Figure 3:
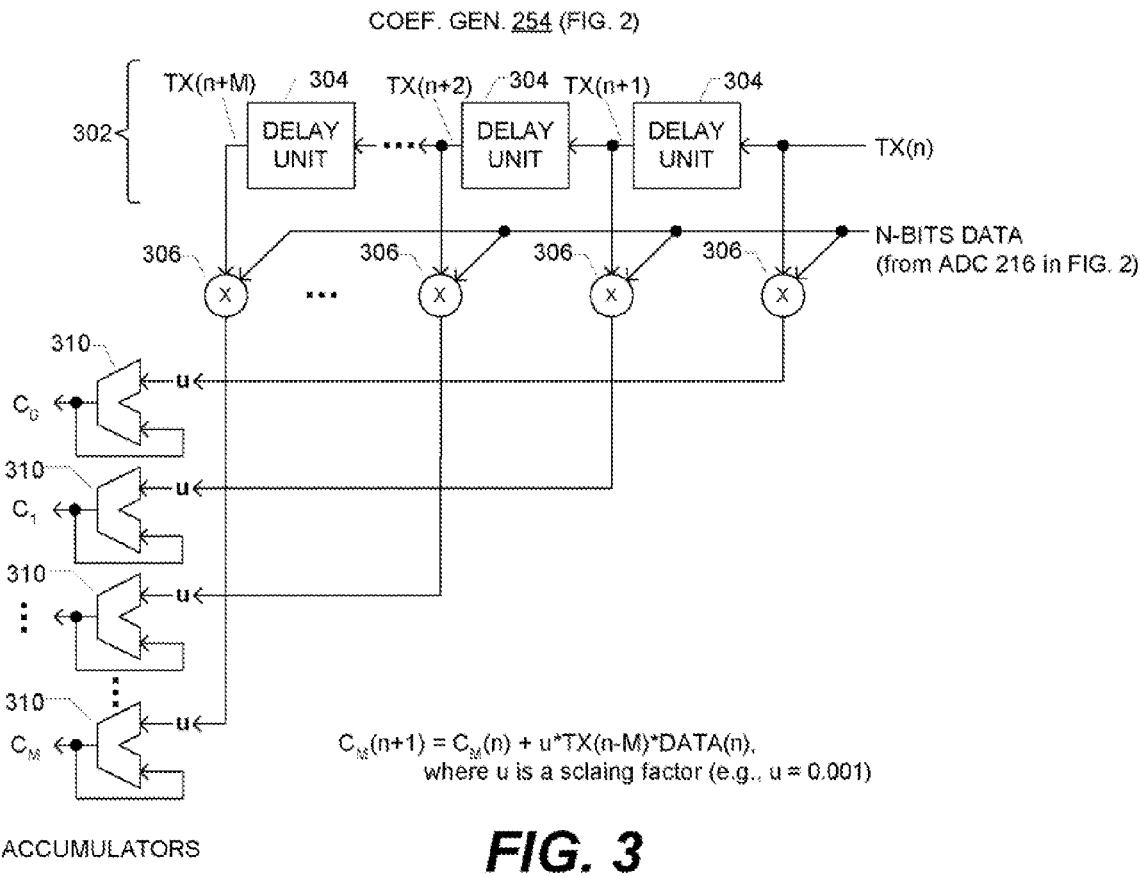
FIG. 3 shows additional details of the coefficient generator of the echo canceller shown in FIG. 2, according to an embodiment of the present invention.
Figure 4:
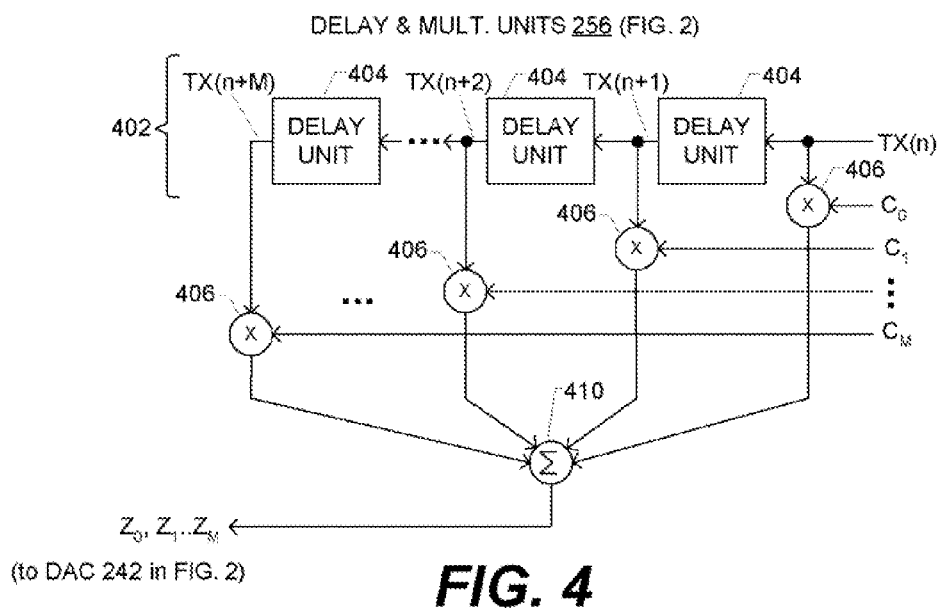
FIG. 4 shows additional details of the delay and multiplication units of the echo canceller shown in FIG. 2, according to an embodiment of the present invention.

The driver 206 is controlled by a transmit (TX) signal output by the timing controller 208 to selectively drive the light source 104. The light detector 114 generates an analog signal (e.g., a current $I_{diode}$) that is indicative of the intensity and phase of the light incident on the light detector 114. The ADC 216 converts the analog signal (e.g., a current) generated by the light detector 114 into a digital signal (e.g., an N-bit signal) that is provided to the coefficient generator 254 of the echo canceller 260. The digital echo cancellation signal (including digital product values $Z_0, Z_1 \ldots Z_N$) output by the echo canceller 260 is converted to an analog echo cancellation signal ($I_{echo\ cancel}$) by a digital-to-analog converter (DAC) 242. Exemplary additional details of the coefficient generator 254 are shown in FIG. 3. Exemplary additional details of the delay and multiplication units 256 are shown in FIG. 4.

Still referring to FIG. 2, at a high level, a feedback loop, which includes the ADC 216, the echo canceller 260 and the DAC 242, is used to adjust the coefficients generated by the coefficient generator 254 (of the echo canceller 260) until an analog echo cancellation signal $I_{echo\ cancel}$ is generated that causes $I_{adc}=I_{diode}-I_{echo\ cancel}\sim 0$ (or a predetermined target other than zero), where $I_{adc}$ can also be referred to as an echo cancelled detection signal or $I_{echo\ cancelled}$. In other words, the coefficients are adjusted by the feedback loop until $I_{diode}\sim I_{echo\ cancel}$ (or until $I_{diode}\sim I_{echo\ cancel}$+a predetermined target value). Based on the coefficients (e.g., $C_0, C_1 \ldots C_M$), which are indicative of the time of flight (TOF) and phase of light pulses, the proximity detector block 270 can detect the proximity of one or more objects within the sense region of the optical sensor 202. In other words, since these coefficients provide information indicative of the distance travelled by the echoes being cancelled (with the echoes being reflected light originating from the light source 104), the distance(s) to one or more objects can be determined based on the phase and times of flight of detected reflected light pulses.

Where multiple objects are within the sense region of the optical sensor, the phase of the multiple detected reflections and the corresponding multiple times of flight can be used to detect the presence of, distance to, and motion of multiple objects simultaneously. Look-up-tables and/or algorithms can be used by the proximity detector block 270 to convert the coefficient values into distance values. Beneficially, embodiments of the present invention provide robustness to reflections from different colored and different sized objects, because the values of the calculated times of flight are independent of the amplitude of the reflections, as long as the magnitudes of the reflected signals are above the system noise floor.

In accordance with an embodiment, the TX signal is a pseudo-random sequence of 1s and 0s, which causes the transmitted light pulses and reflected light to have the pseudo-random sequence. A benefit of the TX signal and light pulses being pseudo random is that the feedback loop is guaranteed to converge. For each "tone" in the transmit power spectral density, two coefficients or "two" objects can be detected. This is because the each tone has two properties, amplitude and phase.

The configuration of FIG. 2 can be used to produce an analog echo cancelled detection signal ($I_{adc}$) that converges to zero. Alternatively, if the desire is for the analog echo cancelled detection signal ($I_{adc}$) to have some other predetermined target magnitude (i.e., other than zero), a summer (which alternatively be referred to as a subtractor in this instance) can be included between the output of the ADC 216 and the input to the coefficient generator 254, where the summer is used to subtract an offset target magnitude value from the output of the ADC 216. This will cause the feedback loop, which includes the ADC 216, the echo canceller 260 and the DAC 242, to adjust the coefficients generated by the coefficient generator 254 (of the echo canceller 260) until the analog echo cancellation signal $I_{echo\ cancel}$ is generated that causes $I_{adc}=I_{diode}-I_{echo\ cancel}\sim$ an analog equivalent of the predetermined target magnitude.

While the DAC 242 is shown as being outside the echo canceller 260 in FIG. 2, the DAC 242 can be implemented as part of the echo canceller 260. Similarly, while the ADC 216 in FIG. 2 is shown as being outside the echo canceller, the ADC 216 can be implemented as part of the echo canceller 260.

In summary, the driver 206 selectively drives the light source 104. The light detector 114 produces a detection signal ($I_{diode}$) indicative of an intensity of light detected by the light detector 114. The light detected by the light detector 114 can include light transmitted by the light source 104 that was reflected off one or more object(s) within the sense region of the optical sensor. The light detected by the light detector 114 can also include interference light, which includes light transmitted by the light source 104, and detected by the light detector 114, that was not reflected off an object within the sense region of the optical sensor. The echo canceller 260 is used to produce an echo cancellation signal ($I_{echo\ cancel}$) that is combined with the detection signal ($I_{diode}$) produced by the light detector 114 to produce an echo cancelled detection signal ($I_{adc}$) having a predetermined target magnitude, which can be zero, or some other value. The coefficient generator 254 of the echo canceller 260 produces echo cancellation coefficients ($C_0, C_1 \ldots C_M$) that are indicative of distance(s) to one or more objects within the sense region of the optical sensor 202. The proximity detector 270 detects distance(s) to the one or more objects within the sense region of the optical sensor 202 based on the echo cancellation coefficients generated by the coefficient generator 254. Motion can be detected by detecting changes in the distance(s) to the object(s).

Referring now to FIG. 3, in accordance with an embodiment, the coefficient generator 254 includes a delay line 302 that includes delay units 304 connected one after another in series. The delay line 302 receives the transmit signal (TX), and each delay unit 304 produces a different delayed version of the transmit signal (TX), e.g., TX(n+1), TX(n+2) . . . TX(n+M), where M is the number of delay units 304 in the delay line 302. The coefficient generator 254 also includes multipliers 306, each of which multiplies the digital version of the echo cancelled detection signal (output from the ADC 216 in FIG. 2) by either the transmit signal (TX) or a different one of the delayed versions of the transmit signal produced by the delay units 304, to thereby produce a plurality of corresponding products. Additionally, the coefficient generator 254 includes accumulators 310, each of which receives a different one of the products produced by the multipliers 306 (or a scaled version thereof, produced using a scaling factor u, e.g., u=0.001) and outputs a different one of the echo cancellation coefficients ($C_0, C_1 \ldots C_M$).

Each accumulator 310 acts to de-correlate the echo cancelled detection signal ($I_{adc}$) from a delayed version of the transmit signal (TX). After convergence of the feedback loop, the final values stored in the accumulators 310 are proportional to the magnitude of the detected reflections at different time delays, and thus, will depend on the distance(s) to, size(s) of, and color(s) of the object(s) within the sense region of the optical sensor. Each accumulator 310 essentially calculates and stores information related to the magnitude of the reflection at a particular delay, so that the presence of a non-zero value in a particular accumulator indicates a reflection detected at its associated time delay (where time delay is indicative of round trip TOF). The presence of non-zero coefficients in multiple accumulators 310 can be used to detect the presence of, and distance to, multiple objects. Each accumulator can be implemented, e.g., as a digital integrator, or alternatively as an analog integrator, but is not limited thereto.

As just explained, the presence of a non-zero value in a particular accumulator 310 indicates a reflection detected at its associated time delay. For example, where an accumulator calculates the integral of (Iadc*Tx(n−5)), the value in that accumulator is indicative of how much of Tx(n−5) is in the analog echo cancelled detection signal ($I_{adc}$). If there is a big reflection at a distance corresponding to five clock cycle delays, the corresponding echo cancellation coefficient (e.g., $C_5$) will also be big, indicating an object at a phase of five clock cycle delays. Each accumulator 310 acts as the integrator part of a correlation function, where correlation is a measure of linear dependence. When the echo cancelled detection signal ($I_{adc}$) has all the echos cancelled, there should be no correlation between the echo cancelled detection signal ($I_{adc}$) signal and any delayed transmit light pulse. When this occurs, the feedback loop stops adapting. In the end, the echo cancelled detection signal ($I_{adc}$) should be "white" and uncorrelated with any previous transmit light pulse, which means all delayed versions of the transmit signal (TX) have been cancelled in the echo cancelled detection signal ($I_{adc}$).

Assuming, for example, that the echo cancellation coefficients $C_5$ and $C_6$ are indicative, respectively, of objects at distances corresponding to five and six clock cycle delays away (in terms of round trip TOF) from the sensor, these coefficient can also be used to identify when an object is between those two distances. For example, where the coefficients $C_5$ and $C_6$ have equal values, this may be indicative of an object at a distance that corresponds to five and one-half clock cycle delays away from the sensor (i.e., the round trip TOF is equal to 5.5 clock cycles). For another example, if the TOF corresponds to 5.8 clock cycles, then the coefficient at $C_6$ corresponding to six clock cycle delays should be significantly larger than the coefficient $C_5$ corresponding to five clock cycle delays. In accordance with an embodiment, a distance detection algorithm can use a weighted average of the coefficients to estimate a distance to the object. Continuing with the previous example, where the coefficients $C_5$ and $C_6$ have equal values, this may alternatively be indicative of an object at a distance corresponding to five clock cycle delays away from the sensor, and a further object at a distance that corresponds to six clock cycle delays away from the sensor. If the two objects are moving in opposite directions or at different speeds, an algorithm can be used to distinguish between a single object located at a distance corresponding to a number of clock cycle delays between the pair of coefficients $C_5$ and $C_6$, and two separate objects located at two different distances.

Additional details of the delay and multiplication units 256 of the echo canceller 260, according to an embodiment, will now be described with reference to FIG. 4. Referring to FIG. 4, the delay and multiplication units 256 include a delay line 402, multipliers 406, and a summer 410. The delay line 402 includes delay units 404 connected one after another in series. The delay line 402 receives the transmit signal (TX), and each delay unit 404 produces a different delayed version of the transmit signal (TX). Since the delay lines 402 and 302 operate in the same manner and perform the same function, a single delay line can be shared by the coefficient generator 254 and the delay and multiplication units 256, rather than having two separate delay lines. Each of the multipliers 406 multiplies a different one of the echo cancellation coefficients ($C_0, C_1 \ldots C_M$) generated by the coefficient generator 254 by either the transmit signal (TX) or a different one of the delayed versions of the transmit signal produced by the delay units 404, to thereby produce a plurality of corresponding products. The summer 410 sums the products produced by the multipliers 406, and outputs the digital echo cancellation signal (including digital product values $Z_0, Z_1 \ldots Z_N$) output by the echo canceller 260, which is converted to the analog echo cancellation signal ($I_{echo\ cancel}$) by the DAC 242 in FIG. 2.

To make convergence of the feedback loop faster, in cases where the ADC 216 has a DC offset, an additional DC tap (that does not receive the TX(n) signal) can be added in both FIGS. 3 and 4, where $C_{DC}(n+1)=C_{DC}(n)+u*DATA(n)$. Alternative types of DC correction are also possible, and within the scope of the present invention.

Figure 5:
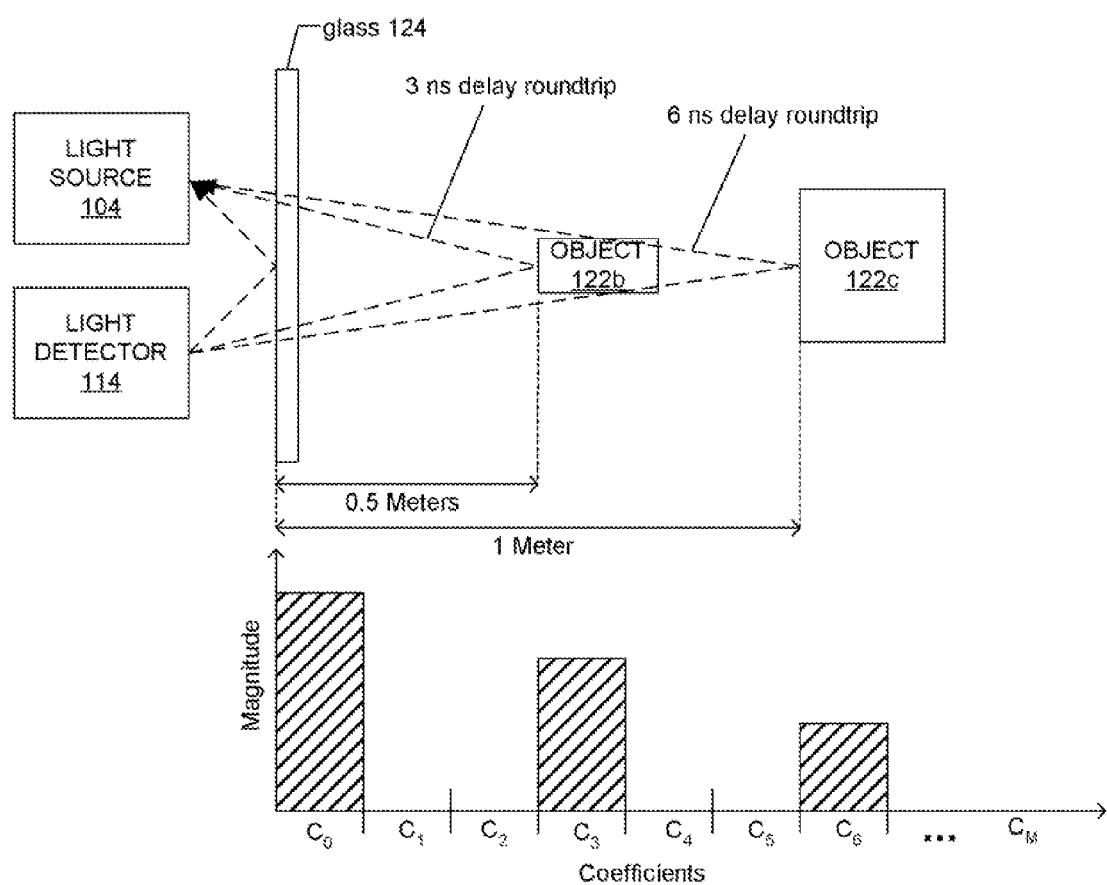
FIG. 5 is used to illustrate the echo canceller response for glass and two objects at different distances.

FIG. 5 is used to illustrate the echo canceller response for glass and two objects at different distances. In this example, the coefficients $C_0$, $C_3$ and $C_6$ correspond, respectively, to the glass 124, the object 122b and the object 122c. Each non-zero coefficient identifies an object at a distance. In this example, the coefficient $C_3$ is indicative of the reflection from the object 122b that is detected 3 ns after its transmission; and the coefficient $C_6$ is indicative of the reflection from the object 122c that is detected 6 ns after its transmission. Based on time of flight (TOF), this means that the object 122b is located 0.3 meters from the proximity sensor 202, and the object 122c is located 0.6 meters from the proximity sensor 202, as can be determined by the proximity detector 270. The coefficient $C_0$ is used to compensate for interference light, including but not limited to the specular reflection from the glass 124.

Figure 6A:
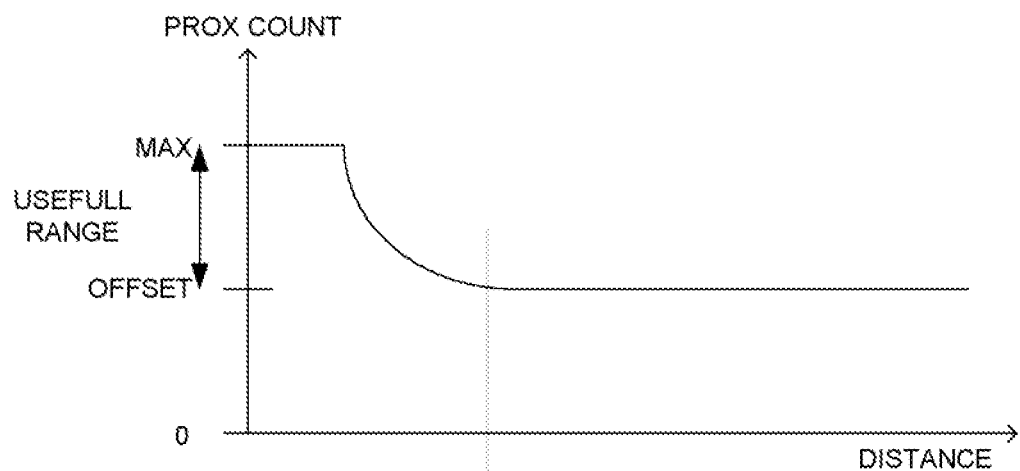
FIGS. 6A and 6B are exemplary graphs illustrating proximity count versus distance, which are used to illustrate how embodiments of the present invention can be used to improve the usable range and detection distance of an optical sensor.
Figure 6B:
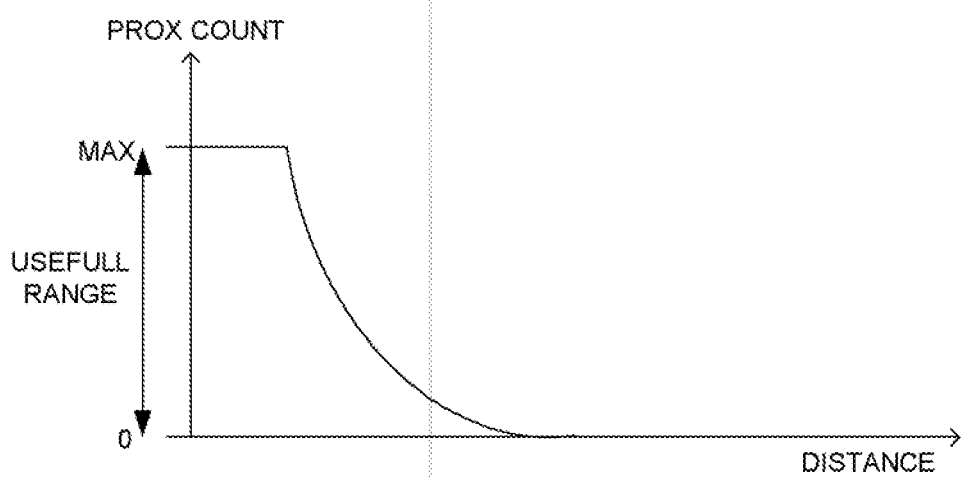

FIG. 6A is an exemplary graph that illustrates proximity count versus distance for the optical sensor 102 of FIG. 1A, which does not use echo cancellation techniques to compensate for interference light when detecting proximity. The proximity count represents an output of the ADC 116. The offset shown in FIG. 6A adversely affects (i.e., reduces) the useful range of the optical sensor. The extent of the offset is dependent on the extent of the interference light. For example, the offset would most likely be largest if a barrier (e.g., 110) between the light source and light detector was not present. FIG. 6B is an exemplary graph that illustrates proximity count versus distance for an optical sensor that uses echo cancellation techniques to compensate for interference light (including specular reflections from the glass 124) when detecting proximity according to embodiments of the present invention. Notice how in FIG. 6B the usable range of the optical sensor is increased, as is the detection distance, as compared to FIG. 6A. In certain embodiments, rather than completely removing the offset, as shown in FIG. 6B, embodiments of the present invention can be used to reduce the offset to a predetermined amount (e.g., a target offset), as was explained above Embodiments of the present invention can be used together with techniques that are used to compensate for ambient light. For example, the ADC 116 can be implemented in the manner described with reference to FIGS. 5-6 of commonly assigned U.S. patent application Ser. No. 12/716,220, entitled "Proximity Sensors with Improved Ambient Light Rejection", filed Mar. 2, 2010, by Xijian Lin, which is incorporated herein by reference. Additionally, or alternatively, an optical IR rejection filter can be placed over the light detector 114. Such an IR rejection filter may be incorporated into or onto the cover plate 124, can be below or above the cover plate 124, or can be integrally formed as part of the light detector 114.

Figure 7:
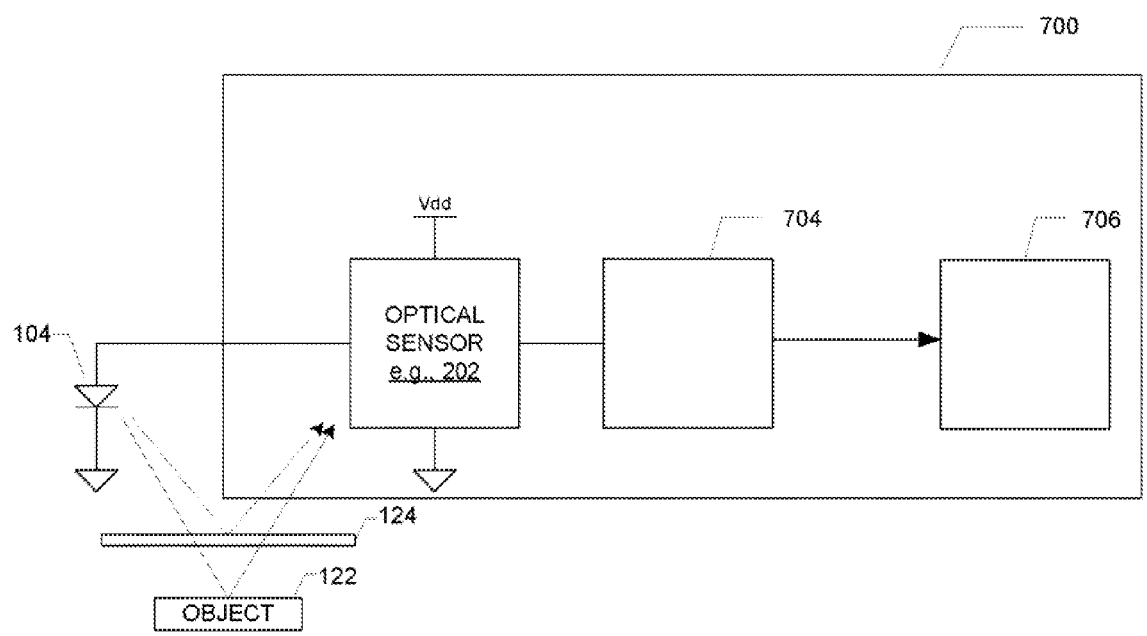
FIG. 7 is a high level block diagram of a system according to an embodiment of the present invention.

Optical sensors of embodiments of the present invention can be used in various systems, including, but not limited to, mobile phones, tablets, personal data assistants, laptop computers, netbooks, other handheld-devices, as well as non-handheld-devices. Referring to the system 700 of FIG. 7, for example, the optical sensor 202 can be used to control whether a subsystem 706 (e.g., a touch-screen, display, backlight, virtual scroll wheel, virtual keypad, navigation pad, etc.) is enabled or disabled. For example, the optical sensor can detect when an object, such as a person's finger, is approaching, and based on the detection either enable (or disable) a subsystem 706. More specifically, one or more output of the optical sensor 202 can be provided to a comparator or processor 704 which can, e.g., compare the output(s) of the optical sensor to one or more threshold, to determine whether the object is within a range where the subsystem 706 should be enabled (or disabled, depending on what is desired). Multiple thresholds (e.g., stored digital values) can be used, and more than one possible response can occur based on the detected proximity of an object. For example, a first response can occur if an object is within a first proximity range, and a second response can occur if the object is within a second proximity range. Exemplary responses can include starting or stopping, or enabling or disabling, various system and/or subsystem operations.

Figure 8:
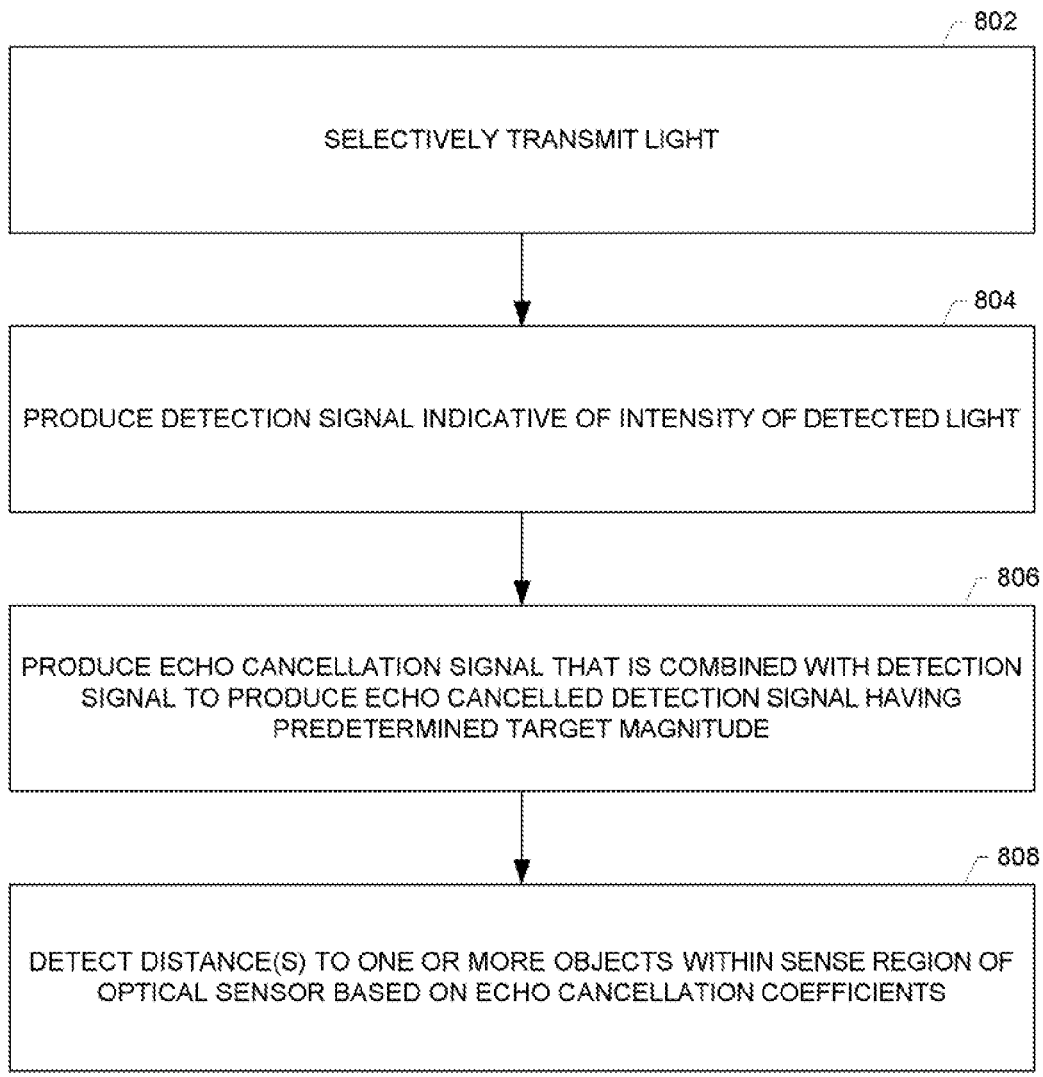
FIG. 8 is a high level flow diagram that is used to summarize methods according to various embodiments of the present invention.

FIG. 8 is a high level flow diagram that is used to summarize methods according to various embodiments of the present invention. Referring to FIG. 8, at step 802, light is selectively transmitted, e.g., by selectively driving a light source (e.g., 104) using a driver (e.g., 206) and a timing controller (e.g., 208). At step 804, a detection signal indicative of an intensity of detected light is produced, e.g., using a light detector 114. The detection signal can include transmitted light that was reflected off one or more objects within the sense region of the optical sensor and was detected by the optical sensor. Additionally, the detection light can include interference light, which includes transmitted light that was detected by the optical sensor, but was not reflected off an object within the sense region of the optical sensor. As was explained above, the interference light can include specular reflections, other internal reflections and/or light leaking under, over and/or through a barrier that separates a light detector from a light source. At step 806, an echo cancellation signal is produced, wherein the echo cancellation signal is combined with the detection signal to produce an echo cancelled detection signal having a predetermined target magnitude, which can be zero. In accordance with an embodiment, producing the echo cancellation signal, at step 806, includes producing echo cancellation coefficients that are indicative of distance(s) to one or more objects within the sense region of the optical sensor. The method can also include, at step 808, detecting distance(s) to one or more objects within the sense region of the optical sensor based on the echo cancellation coefficients. As was described above, the echo cancellation signal compensates for at least a portion of the interference light detected by the optical sensor and is indicative of one or more objects, if any, within the sense region of the optical sensor. Additional details of such methods can be appreciated from the above discussion of FIGS. 2-7.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The breadth and scope of the present invention should not be limited by any of the above-described exemplary embodiments, but should be defined only in accordance with the following claims and their equivalents.

What is claimed is:

1. An optical sensor that can be used to detect the presence, proximity and/or motion of an object within the sense region of the optical sensor, comprising:
    a driver adapted to selectively drive a light source;
    a light detector adapted to produce a detection signal indicative of an intensity of light detected by the light detector;
    an echo canceller adapted to produce an echo cancellation signal that is combined with the detection signal produced by the light detector to produce an echo cancelled detection signal, the echo canceller including a coefficient generator that is adapted to produce echo cancellation coefficients that are indicative of distance(s) to one or more objects, if any, within the sense region of the optical sensor; and
    an analog-to-digital converter (ADC) that converts the echo cancelled detection signal to a digital version of the echo cancelled detection signal which is provided to the coefficient generator, wherein the ADC can be part of the echo canceller or external to the echo canceller.

2. The optical sensor of claim 1, further comprising:
    a proximity detector adapted to detect distance(s) to one or more objects within the sense region of the optical sensor based on the echo cancellation coefficients generated by the coefficient generator.

3. The optical sensor of claim 1, wherein:
    the light detected by the light detector includes
        light transmitted by the light source that was reflected off one or more objects within the sense region of the optical sensor, and
        interference light, which comprises light transmitted by the light source, and detected by the light detector, that was not reflected off an object within the sense region of the optical sensor; and
    the echo cancellation signal compensates for at least a portion of the interference light included in the light detected by the light detector and is indicative of one or more objects, if any, within the sense region of the optical sensor.

4. The optical sensor device of claim 3, wherein the interference light includes one or more of the following:
    specular reflections;
    internal reflections; or
    light leaking under, over and/or through a barrier that separates the light detector from the light source.

5. The optical sensor device of claim 3, further comprising:
    a light transmissive cover plate that covers at least one of the light detector and the light source;
    wherein the interference light includes specular reflections caused by the light transmissive cover plate.

6. The optical sensor of claim 1, further comprising:
    a timing controller configured to produce a transmit signal (TX) that is used to control the driver and the echo canceller.

7. The optical sensor of claim 6, wherein the transmit signal (TX) comprises a pseudo-random binary sequence.

8. The optical sensor of claim 6, wherein the coefficient generator comprises:
    a delay line comprising a plurality of delay units connected one after another in series, wherein the delay line receives the transmit signal (TX), and wherein each delay unit produces a different delayed version of the transmit signal (TX);
    a plurality of multipliers, each of which is configured to multiply the digital version of the echo cancelled detection signal by either the transmit signal (TX) or a different one of the delayed versions of the transmit signal produced by the delay units, to thereby produce a plurality of corresponding products; and
    a plurality of accumulators, each of which receives a different one of the products produced by the plurality of multipliers, or a scaled version thereof, and outputs a different one of the echo cancellation coefficients ($C_0$, $C_1 \ldots C_M$).

9. The optical sensor of claim 1, wherein the echo cancelled detection signal has a predetermined target magnitude.

10. The optical sensor of claim 9, wherein the predetermined target magnitude of the echo cancelled detection signal is zero.

11. The optical sensor of claim 9, wherein the predetermined target magnitude of the echo cancelled detection signal is a non-zero offset value.

12. An optical sensor that can be used to detect the presence, proximity and/or motion of an object within the sense region of the optical sensor, comprising:
a driver adapted to selectively drive a light source;
a light detector adapted to produce a detection signal indicative of an intensity of light detected by the light detector;
an echo canceller adapted to produce an echo cancellation signal that is combined with the detection signal produced by the light detector to produce an echo cancelled detection signal; and
a timing controller configured to produce a transmit signal (TX) that is used to control the driver and the echo canceller;
the echo canceller including
a coefficient generator adapted to produce echo cancellation coefficients that are indicative of distance(s) to one or more objects, if any, within the sense region of the optical sensor;
a delay line comprising a plurality of delay units connected one after another in series, wherein the delay line receives the transmit signal (TX), and wherein each delay unit produces a different delayed version of the transmit signal (TX);
a plurality of multipliers, each of which is configured to multiply a different one of the echo cancellation coefficients ($C_0, C_1 \ldots C_M$) generated by the coefficient generator by either the transmit signal (TX) or a different one of the delayed versions of the transmit signal produced by the delay units, to thereby produce a plurality of corresponding products; and
a summer configured to sum the plurality of products produced by the plurality of multipliers;
wherein a sum produced by the summer is provided to a digital-to-analog converter (DAC) that converts the sum produced by the summer to the echo cancellation signal that is combined with the detection signal produced by the light detector to produce the echo cancelled detection signal, wherein the DAC can be part of the echo canceller or external to the echo canceller.

13. A method for use with an optical sensor, comprising:
(a) producing a transmit signal (TX);
(b) selectively transmitting light using the transmit (TX) signal;
(c) producing a detection signal indicative of an intensity of detected light that can include
transmitted light that was reflected off one or more objects within the sense region of the optical sensor and was detected by the optical sensor, and
interference light, which comprises transmitted light that was detected by the optical sensor, but was not reflected off an object within the sense region of the optical sensor; and
(d) producing an echo cancellation signal that is combined with the detection signal to produce an echo cancelled detection signal, wherein the producing the echo cancellation signal includes
producing a plurality of a different delayed versions of the transmit signal (TX);
multiplying a digital version of the echo cancelled detection signal by the transmit signal (TX), and by the plurality of different delayed versions of the transmit signal, to thereby produce a plurality of corresponding different products; and
separately accumulating each of the different products produced as a result of the multiplying, or scaled versions thereof, to produce echo cancellation coefficients ($C_0, C_1 \ldots C_M$) that are indicative of distance(s) to one or more objects within the sense region of the optical sensor.

14. The method of claim 13, wherein the echo cancelled detection signal has a predetermined target magnitude.

15. The method of claim 14, wherein the predetermined target magnitude of the echo cancelled detection signal is zero.

16. The method of claim 14, wherein the predetermined target magnitude of the echo cancelled detection signal is a non-zero offset value.

17. The method of claim 13, further comprising:
(e) detecting distance(s) to one or more objects within the sense region of the optical sensor based on the echo cancellation coefficients.

18. The method of claim 13, wherein the echo cancellation signal compensates for at least a portion of the interference light detected by the optical sensor and is indicative of one or more objects, if any, within the sense region of the optical sensor.

19. The method of claim 13, wherein the producing the echo cancellation signal at step (e) includes:
multiplying each of the echo cancellation coefficients ($C_0, C_1 \ldots C_M$) by either the transmit signal (TX), or by a different one of the plurality of different delayed versions of the transmit signal, to thereby produce a plurality of corresponding different products;
summing the plurality of products produced as a result of the multiplying to thereby produce a sum; and
converting the sum to an analog signal which is the echo cancellation signal.

20. The method of claim 19, further comprising:
(e) detecting distance(s) to one or more objects within the sense region of the optical sensor based on the echo cancellation coefficients ($C_0, C_1 \ldots C_M$).

21. A system, comprising:
a light source;
a driver adapted to selectively drive the light source;
a light detector adapted to produce a detection signal indicative of an intensity of light detected by the light detector;
an echo canceller adapted to produce an echo cancellation signal that is combined with the detection signal produced by the light detector to produce an echo cancelled detection signal, the echo canceller including a coefficient generator adapted to produce echo cancellation coefficients that are indicative of distance(s) to one or more objects within the sense region of the optical sensor;
an analog-to-digital converter (ADC) that converts the echo cancelled detection signal to a digital version of the echo cancelled detection signal which is provided to the coefficient generator, wherein the ADC can be part of the echo canceller or external to the echo canceller; and
a proximity detector adapted to produce one or more output(s) indicative of the presence of, and distance(s) to, one or more objects within the sense region of the optical sensor based on the echo cancellation coefficients generated by the coefficient generator.

22. The system of claim 21, further comprising:
a timing controller configured to produce a transmit signal (TX) that is used to control the driver and the echo canceller.

23. The system of claim 22, wherein the coefficient generator comprises:
a delay line comprising a plurality of delay units connected one after another in series, wherein the delay line receives the transmit signal (TX), and wherein each delay unit produces a different delayed version of the transmit signal (TX);
a plurality of multipliers, each of which is configured to multiply the digital version of the echo cancelled detection signal by either the transmit signal (TX) or a different one of the delayed versions of the transmit signal produced by the delay units, to thereby produce a corresponding product; and
a plurality of accumulators, each of which receives a different one of the products produced by the plurality of multipliers, or a scaled version thereof, and outputs a different one of the echo cancellation coefficients ($C_0$, $C_1 \ldots C_M$).

24. The system of claim 22, wherein the echo canceller also comprises:
a delay line comprising a plurality of delay units connected one after another in series, wherein the delay line receives the transmit signal (TX), and wherein each delay unit produces a different delayed version of the transmit signal (TX);
a plurality of multipliers, each of which is configured to multiply a different one of the echo cancellation coefficients ($C_0$, $C_1 \ldots C_M$) generated by the coefficient generator by either the transmit signal (TX) or a different one of the delayed versions of the transmit signal produced by the delay units, to thereby produce a plurality of corresponding products; and
a summer configured to sum the plurality of products produced by the plurality of multipliers;
wherein a sum produced by the summer is provided to a digital-to-analog converter (DAC) that converts the sum produced by the summer to the echo cancellation signal that is combined with the detection signal produced by the light detector to produce the echo cancelled detection signal, wherein the DAC can be part of the echo canceller or external to the echo canceller.

25. The system of claim 21, wherein the echo cancelled detection signal has a predetermined target magnitude.

26. The system of claim 21, further comprising:
a comparator or processor configured to compare the one or more output(s) of the proximity detector to one of more threshold(s); and
a subsystem that is controlled based on a result of the one or more comparisons performed by the comparator or processor.

\* \* \* \* \*